May 1, 1923.
J. F. O'CONNOR
1,453,691
FRICTION SHOCK ABSORBING MECHANISM
Filed Oct. 30, 1919
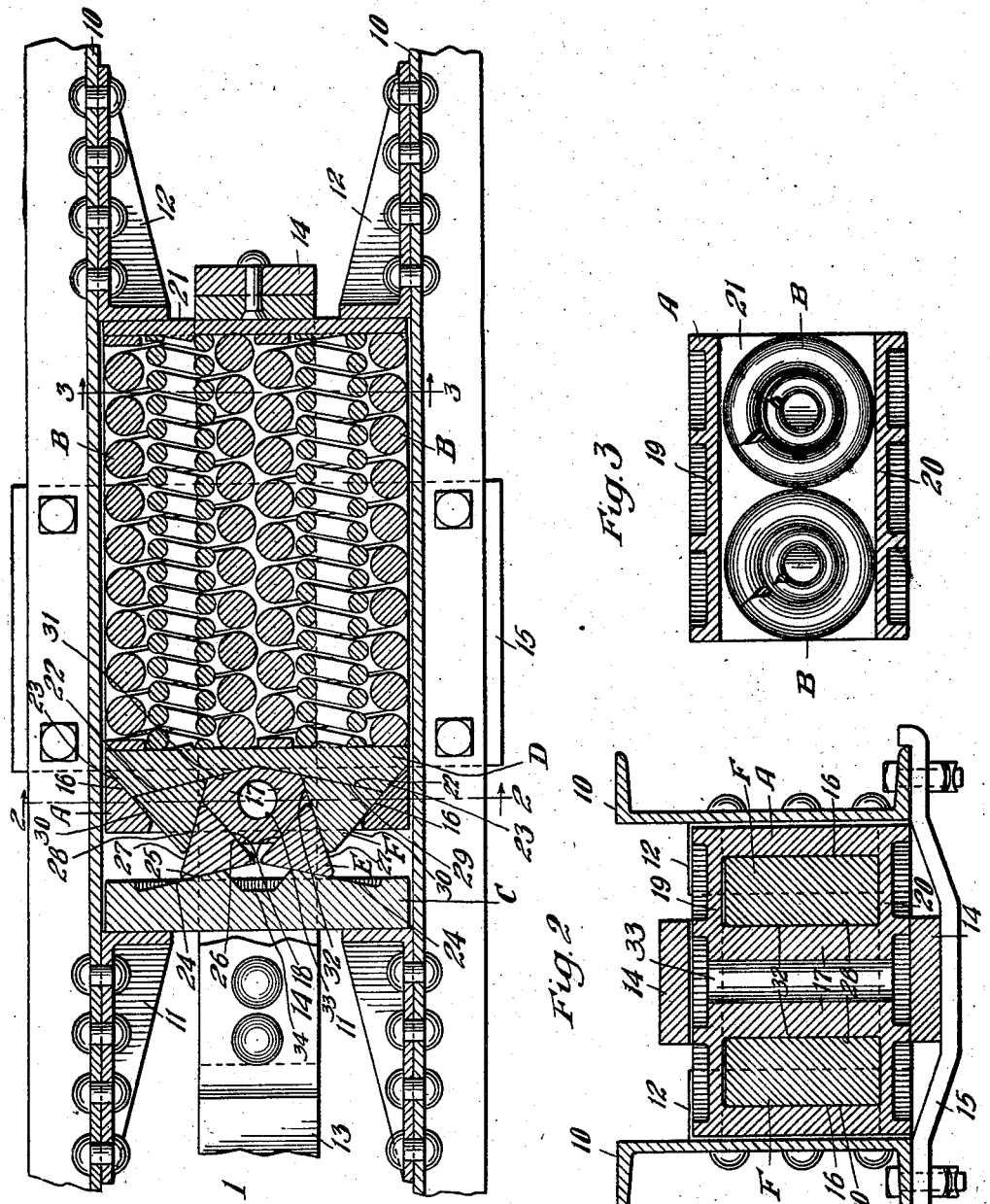
Witnesses
Wm. Geiger
Inventor
John F. O'Connor
By Geo. I. Haight
His Atty Patented May 1, 1923.

1,453,691

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed October 30, 1919. Serial No. 334,568.

*To all whom it may concern:*

Be it known that I, JOHN F. O'CONNOR, a citizen of United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a friction shock absorbing mechanism especially adapted for railway draft rigging and wherein is provided high capacity combined with certain release.

In the drawing forming a part of this specification, Fig. 1, is a horizontal longitudinal sectional view of a railway draft rigging showing my improvements embodied therein. Fig. 2 is a vertical transverse sectional view taken substantially on the line 2—2 of Fig. 1. And Fig. 3 is a vertical sectional view taken transversely of the friction shell substantially on the line 3—3 of Fig. 1.

In said drawing, 10—10 denote channel center or draft sills of a railway car to the inner faces of which are secured front stop lugs 11—11 and rear stop lugs 12—12 spaced the usual distance apart of 24⅝ inches. A portion of the draw bar is indicated at 13 and the same is operatively connected with the shock absorbing mechanism proper by a yoke 14 of usual construction. The parts are supported in place by any suitable means such as the detachable saddle plate 15.

My improved shock absorbing mechanism proper, as shown, comprises broadly, a combined friction shell and spring cage designated generally by the reference A; twin main springs B—B; an outer or front follower C; an inner spring follower D; and two sets of friction elements each comprising an outer friction wedge shoe E and an inner friction wedge shoe F.

The combined shell and cage A is preferably in the form of a casting with a friction shell proper at the forward end thereof. Said shell is provided with outer rearwardly diverging friction surfaces 16—16 and a central integral post 17 which is formed with outer rearwardly diverging friction surfaces 18—18. The friction surfaces 16 and 18 are arranged in pairs, as will be evident from inspection of Fig. 1, and the same are preferably made parallel with each set or pair disposed at an angle to the axis of the mechanism. The casting A is of substantially rectangular cross section and rearwardly of the shell is formed with upper wall 19, lower wall 20 and integral rear wall 21, the latter acting as the rear follower of the gear. The sides of the casting A are left open so as to facilitate insertion of the twin springs B, each of the latter preferably comprising an outer heavy coil and an inner lighter coil.

The spring follower D is located within the casting A at the forward ends of the springs B and the same is provided on its front or outer face with a pair of oppositely extending friction surfaces 22—22 which are arranged at a comparatively blunt angle with the axis of the gear and diverge in a forward direction. At its ends, the follower D is beveled as indicated at 23—23 so as to form a snug fit against the friction surfaces 16 when the parts are in normal position.

The outer follower C bears against the rear end of the draw bar and on its inner face is provided with a pair of inclined friction surfaces 24—24, the same being preferably parallel with the friction surfaces 22—22 of the spring follower D.

Each of the elements E and F is in the form of a regular prism of equilateral triangular cross section.

The friction elements E and F are of such height vertically as to slide freely and be guided between the upper and lower walls of the friction shell. Each outer friction element E has an outer friction surface 25 which co-operates with a corresponding friction surface 24; a side friction surface 26 which co-operates with a corresponding friction surface 18; and a third surface 27 which cooperates with a corresponding surface 28 on the other element F of the same set. Each element F is provided with two other friction surfaces 29 and 30 which co-operate, respectively with the friction surfaces 22 and 16.

The post 17 is suitably beveled as indicated at 31 and 32 to fit the friction surfaces 22 of the follower D and the surfaces 28 of the elements F when all of the parts are in normal position. To facilitate manufacture, the post 17 may be cored as indicated at 33. It will be noted that the post 17 extends a short distance forwardly of the front end of the friction shell which is done in order to obtain larger wearing areas and to accommodate said extended part of the post 17, the follower C is cut away as indicated at 34 to thereby permit the follower C to come into full engagement with the outer end of the friction shell at the end of the compressive stroke.

The operation is as follows: Assuming an inward movement of the draw bar, the follower C will be forced rearwardly which in turn will force the friction elements or shoes E in the same direction. As the elements E travel rearwardly they are simultaneously forced apart laterally due to their sliding engagement on the friction surfaces 18. The combined rearward and lateral movements of the elements E forces the friction elements F rearwardly and also laterally and they in turn force the follower D rearwardly thereby compressing the springs B. During the operation described, it is evident that friction is generated between the following sets of friction surfaces, 24 and 25; 26 and 18; 29 and 22; and 30 and 16. By making the elements E and F independent or separable friction will always be generated during a compression stroke, even though wear takes place on the various friction surfaces for the reason that even though there may be a slight amount of slack at the initiation of the compression stroke, the two elements E and F of each set are bound to be placed in intimate frictional contact with each other and with the friction surfaces of the two followers and the shell.

From the preceding description, it will be noted that I obtain a high combined spring and frictional capacity in a device which is compact and adapted for use in the standard spacing now employed. Also, all of the friction producing parts are of simple design and can be manufactured at comparatively small expense in the form of castings.

I claim:—

1. In a friction shock absorbing mechanism, the combination with a friction shell having a pair of opposed parallel friction surfaces extending at an angle to the axis of the shell; of a pair of followers, one disposed forwardly and the other rearwardly of said friction surfaces, said followers having also opposed parallel friction surfaces extending at a different angle to the axis of the shell; spring means interposed between one of said followers and the shell; and friction elements cooperable with said opposed friction surfaces of the shell and said opposed friction surfaces of the followers, said elements comprising two separate triangular blocks, the blocks being relatively adjustable on each other.

2. In a friction shock absorbing mechanism, the combination with a friction shell having oppositely inclined sets of friction surfaces on each side of the center line thereof, of a spring resistance, a follower engaging one end of said spring resistance, two sets of friction elements co-operable with said friction surfaces of the shell, one element of each set of friction elements engaging said follower, and a second follower, a different element of each of said sets of friction elements engaging said second follower.

3. In a friction shock absorbing mechanism, the combination with a friction shell having two oppositely inclined sets of friction surfaces, each set including a pair of substantially parallel friction surfaces extending at an angle to the center line of the shell, of a pair of followers, one of which is located forwardly of the friction shell surfaces and the other rearwardly thereof, a spring resistance interposed between said shell and one of said followers, the other follower being adapted to receive the actuating pressure, and two sets of friction shoes interposed between and co-operating with said followers and the friction surfaces of the shell, each set of friction shoes comprising a plurality of separate friction shoes relatively adjustable to compensate for wear.

4. In a friction shock absorbing mechanism, the combination with a friction shell having a pair of diverging outer friction surfaces and a central post provided also with a pair of diverging friction surfaces, of two sets of friction elements, the friction elements of each set cooperating with one of said outer friction surfaces and one of said post friction surfaces, means for applying pressure to said sets of friction elements, and spring means for yieldingly resisting movement of said friction elements relatively to the shell.

5. As an article of manufacture, a combined friction shell and spring cage casting, the shell portion of said casting having side walls provided on their inner faces with diverging friction surfaces, the shell portion of said casting having also an integral post located midway between said diverging friction surfaces, said post being provided also with a pair of diverging friction surfaces arranged substantially parallel with the corresponding first mentioned friction surfaces the diverging friction surfaces of said post being extended partly outwardly of the shell.

6. In a friction shock absorbing mechanism, the combination with a combined friction shell and spring cage, the shell having two sets of friction surfaces on opposite sides of the center line of the shell, the friction surfaces of each set being substantially parallel and extending at an angle to the center line of the shell, of a spring resistance mounted within said combined shell and cage, a spring follower within said shell and cage, an outer follower, said followers having sets of substantially parallel friction surfaces arranged at blunt angles to the center line of the shell; and two sets of friction elements interposed between the followers, each set of friction elements comprising a pair of triangular shaped friction blocks, said blocks having friction surfaces co-operable with those of the shell and of the followers.

In witness that I claim the foregoing I have hereunto subscribed my name this 10th day of Oct. 1919.

JOHN F. O'CONNOR.